United States Patent [19]
Wellman

[11] Patent Number: 5,186,968
[45] Date of Patent: Feb. 16, 1993

[54] PROCESS FOR MILLING CEREAL GRAINS

[75] Inventor: Warner Wellman, Omaha, Nebr.

[73] Assignee: ConAgra, Inc., Omaha, Nebr.

[21] Appl. No.: 756,927

[22] Filed: Sep. 9, 1991

[51] Int. Cl.$^5$ .............................................. A23P 1/00
[52] U.S. Cl. ...................................... 426/483; 241/7; 426/622
[58] Field of Search ............... 426/482, 483, 622, 518; 241/7, 9, 261.2, 261.3; 99/607, 617

[56] References Cited

U.S. PATENT DOCUMENTS

| | | | |
|---|---|---|---|
| 4,667,888 | 5/1987 | Anderson | 241/7 |
| 4,674,689 | 6/1987 | Wiggins et al. | 241/261.2 |
| 4,741,913 | 5/1988 | Satake | 426/483 |
| 5,089,282 | 2/1992 | Wellman | 426/483 |
| 5,104,671 | 4/1992 | Wellman | 426/483 |

FOREIGN PATENT DOCUMENTS

| | | |
|---|---|---|
| 295774 | 12/1988 | European Pat. Off. . |
| 0339577 | 11/1989 | European Pat. Off. . |
| 0346872 | 12/1989 | European Pat. Off. . |
| 373274 | 6/1990 | European Pat. Off. . |

Primary Examiner—George Yeung
Attorney, Agent, or Firm—Willian, Brinks, Olds, Hofer, Gilson & Lione

[57] ABSTRACT

A milling system for cereal grains such as wheat includes one or more bran removal machines which removes a substantial fraction of the bran of the incoming wheat to form a pearled wheat. The pearled wheat is then supplied as a feed stock to a disc mill in the first break position. The bran removal machines preferably include inner and outer abrasive elements, wherein the outer abrasive elements extend over a cumulative arc of at least about 250 degrees. Because a substantial portion of the bran is removed prior to the first break position, prior art problems associated with bran fragmentation in a disc mill are reduced.

6 Claims, 10 Drawing Sheets

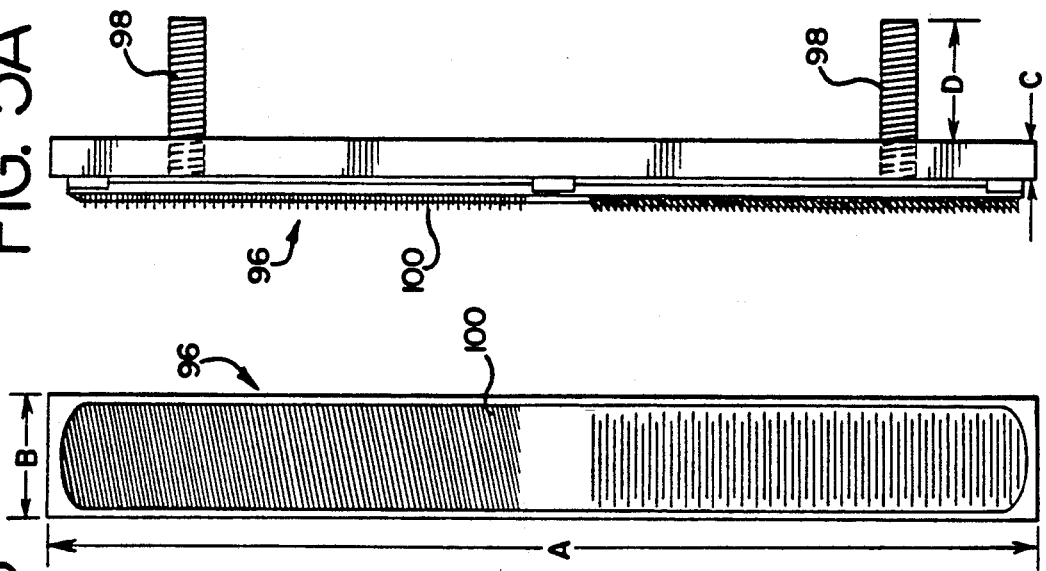
FIG. 5A
FIG. 5B
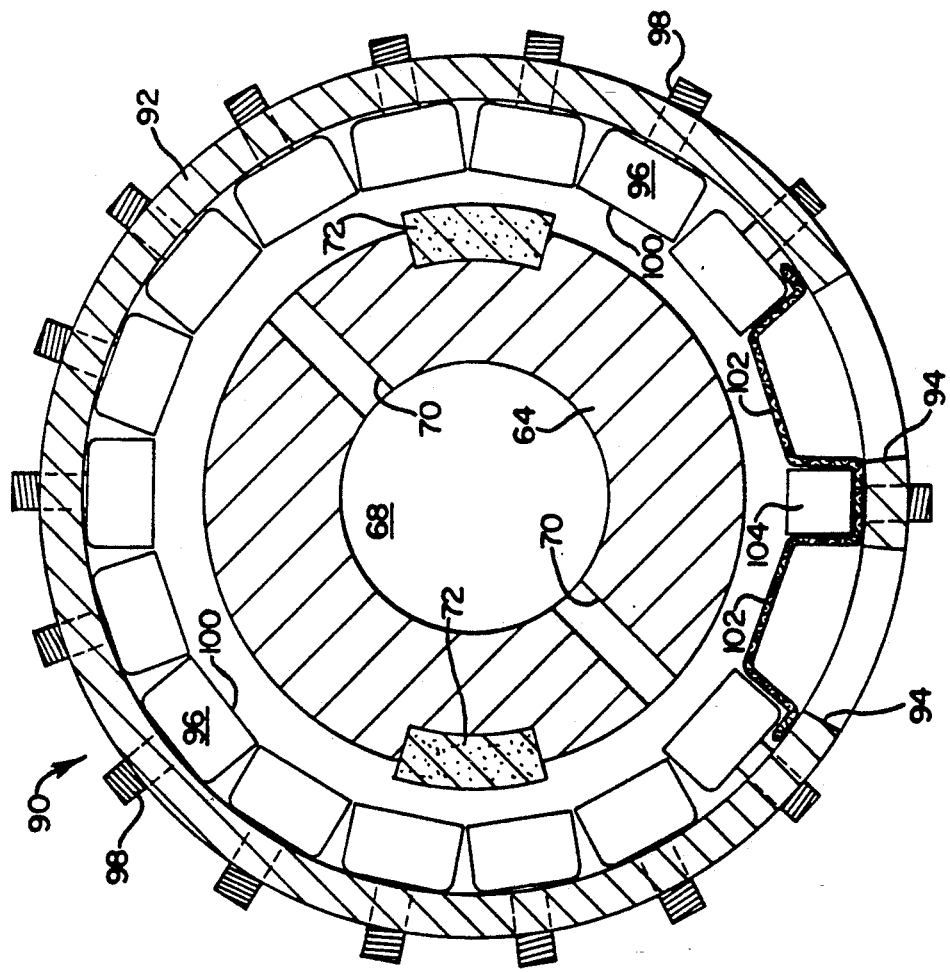
FIG. 4

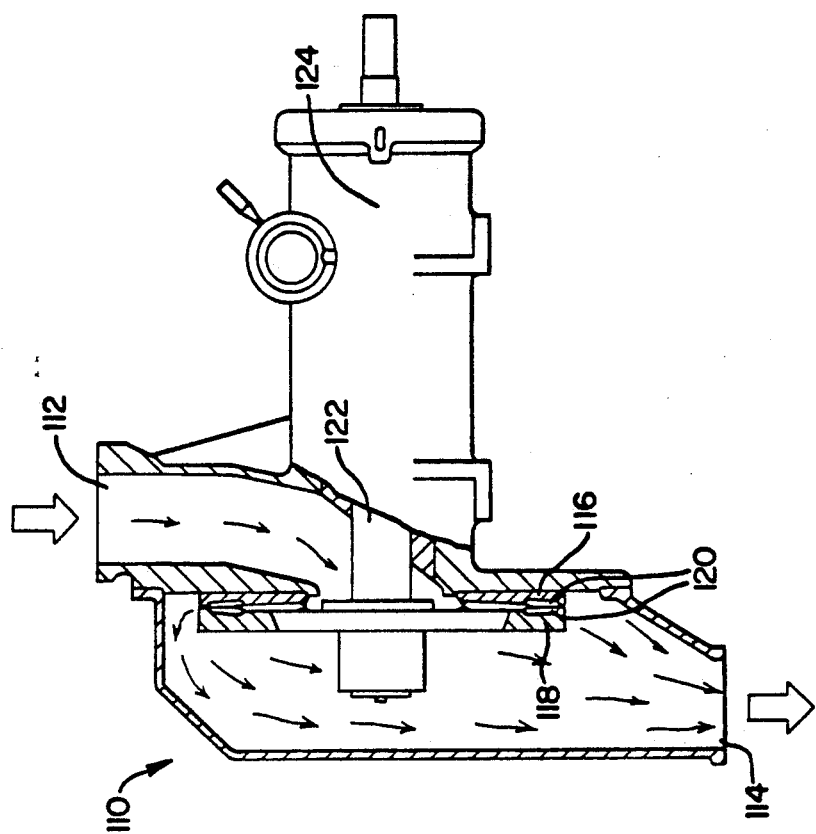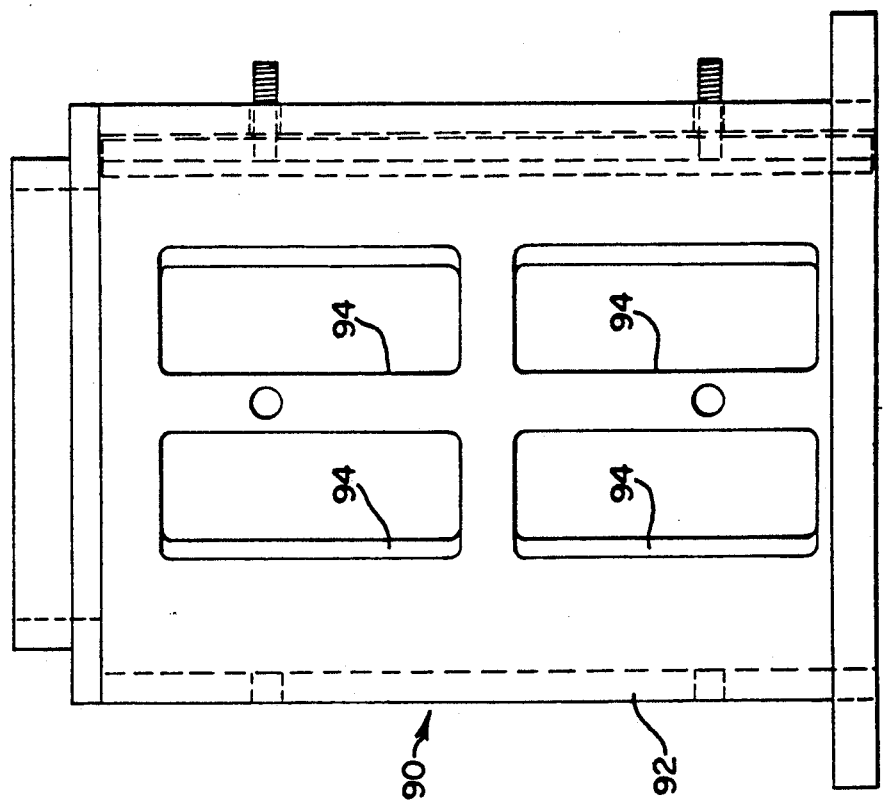

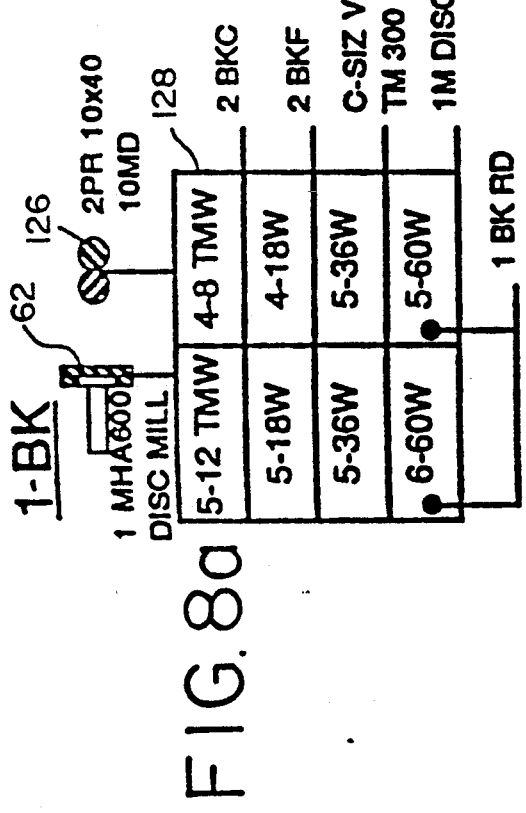

1-MIDDS
1 MHA600 DISC MILL
| | A | B | |
|---|---|---|---|
| 2 | 50SS | 50SS | |
| 3 | 56SS | 54SS | QUAL |
| 8 | 9XX | 9XX | |
| 8 | •10XX | 10XX | 2M |
| | | | FLOUR |
FIG.8i
2-MIDDS A&B
1 MHA600 DISC MILL
| | A | B | |
|---|---|---|---|
| 2 | 2 | 58GG | |
| 3 | 2 | 60GG | 1 TAIL |
| 15 | 19 | •10XX | 3M |
| | | | FLOUR |
FIG.8j
3-MIDDS
∞ 2PR 9x30 SM
| 5-60GG |
| 7-10XX | 1 TAIL
| 10-11XX |
| | 4M
| FLOUR |
FIG.8k
1-TAIL
∞ 1PR 9x36 SM
| 4-36W | SHRTS DSTR |
| 4-56GG | |
| 3-12XX | 2 TAIL |
| 11-11XX | 7M |
| | FLOUR |
FIG.8l

PROCESS FOR MILLING CEREAL GRAINS

BACKGROUND OF THE INVENTION

This invention relates to an improved cereal grain milling system that includes at least one disc mill and also to an improved bran removal machine suit-able for use in such a milling system.

Disc mills such as that described in Anderson U.S. Pat. No. 4,667,888 provide important advantages over conventional roller mills in terms of reduced capital, operating, and maintenance costs combined with increased ease of operation and reduced space requirements. Such disc mills have found use in commercial milling operations, particularly in regrind operations, where most of the bran layer of the grain has been removed and the disc mill operates to reduce the size of the endosperm. However, problems have been encountered that have limited the use of disc mills in the first break position. In particular, when whole grain with an intact bran layer is milled in a disc mill in the first break position, the bran layer is cut into small fragments which can prove difficult to remove efficiently. This disadvantage of disc mills has in the past limited their use.

Accordingly, it is an object of this invention to provide a milling system which allows increased usage of disc mills, and in particular to provide a milling system in which a disc mill can be used efficiently in the first break position.

Another development in milling technology relates to milling systems which combine roller mills with bran removal machines upstream of the roller mills. U.S Pat. application Ser. Nos. 07/557,631 and 07/610,819, assigned to the assignee of the present invention, disclose several such systems. Also of interest in this connection are Satake U.S. Pat. No. 4,741,913 and Tkac European patent applications 0 295 774 and 0 373 274. In all of these milling systems one or more bran removal machines are used to remove the outer bran layer from a quantity of wheat without reducing the size of the endosperm to produce a pearled wheat. This pearled wheat is then introduced into a conventional roller mill as part of a flour making operation.

U.S. Pat. applications Ser. Nos. 07/557,631 and 07/610,819 disclose the use of a vertical flow bran removal machine in which a central rotor is rotated about a vertical axis and the wheat being pearled passes in an annular column between inner and outer abrasive elements. Such a vertical bran removal machine has been found to provide high output and efficient operation. However, the amount of bran that can be efficiently removed in a single pass through a vertical bran removal machine of the type described above is limited.

It is accordingly an object of this invention to provide an improved vertical bran removal machine that is capable of removing an unusually large amount of bran in a single pass.

SUMMARY OF THE INVENTION

According to a first aspect of this invention, a process is provided for milling a quantity of a cereal grain of the type comprising an endosperm and a bran portion. This process includes the step of removing at least a substantial part of the bran portion from the cereal grain without substantially reducing the size of the endosperm to produce a pearled cereal grain, wherein the removed bran portion amounts to at least about 5 wt % of the cereal grain. Then at least a portion of the pearled cereal grain is disc milled to reduce the size of the endosperm and to produce an intermediate product. The endosperm of the pearled cereal grain is substantially unreduced in size prior to the disc milling step. The intermediate product is then further processed to produce a finely divided milled product. By removing a substantial part of the bran without reducing the size of the endosperm prior to the disc milling step, prior art problems associated with bran fragmentation by the disc mill when placed in the first break position are substantially reduced or even eliminated.

According to a second aspect of this invention, an improved enclosure assembly is provided for a bran removal machine of the type comprising a vertically oriented rotor which supports a set of inner abrasive elements for rotation about a vertical axis, an enclosure assembly which surrounds the rotor and defines a grain receiving flow passage between the rotor and the enclosure assembly, a set of passages in the rotor in communication with the flow passage for introducing a gas into the flow passage, and means for rotating the rotor with respect to the enclosure assembly. This improved enclosure assembly comprises a set of outer abrasive elements occupying a cumulative arc of at least about 250 degrees of the enclosure assembly and a set of screens occupying a cumulative arc of no more than about 110 degrees of the enclosure assembly.

The improved bran removal machine described below has been found particularly effective in removing large quantities of bran from cereal grain in a single pass through the machine. This machine is not limited to use with disc mills, but can be used in conjunction with roller mills as described, for example, in the U.S. Pat. applications, the Satake patent, and the Tkac patent applications identified above.

The invention itself, together with further objects and attendant advantages, will best be understood by reference to the following detailed description, taken in conjunction with the accompanying drawings.

BRIEF DESCRIPTION OF THE DRAWINGS

FIG. 4 is a cross-sectional view taken along line 4—4 of FIG. 3.

FIGS. 5a and 5b are face and side views, respectively, of one of the outer abrasive elements of FIG. 4.

FIG. 6 is a side elevational view of an exterior portion of the enclosure assembly of FIG. 4.

FIG. 7 is a side elevational view in partial cutaway of a disc mill suitable for use in the disc milling step of FIG. 1.

DETAILED DESCRIPTION OF THE PRESENTLY PREFERRED EMBODIMENTS

Figure 1:
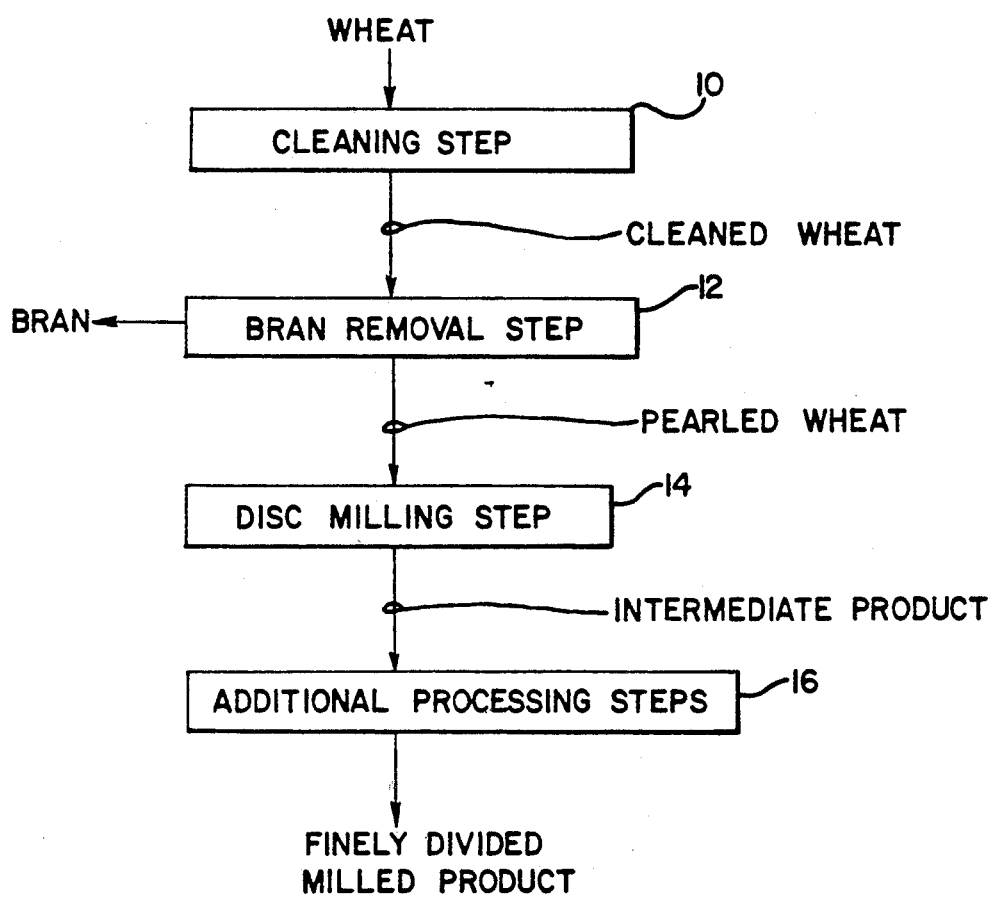
FIG. 1 is a flow diagram of a presently preferred embodiment of the milling system of this invention.

Turning now to the drawings, FIG. 1 shows a flow diagram of the presently preferred embodiment of the milling system of this invention. The illustrated milling system starts with incoming wheat which is cleaned in a cleaning step 10 to produce a cleaned wheat which is then applied to a bran removal step 12. The wheat includes an endosperm surrounded by a bran portion, and in the bran removal step 12 a substantial part of the bran portion is removed without substantially reducing the size of the endosperm to produce a pearled wheat. Preferably, the amount of bran removed in the bran removal step 12 is at least about 5 wt % of the weight of the cleaned wheat.

The pearled wheat produced in the bran removal step 12 is applied to a disc milling step 14 in which the size of the endosperm of the pearled wheat is reduced to produce an intermediate product of reduced particle size. This intermediate product is then further processed in additional processing steps 16 to produce a finely divided milled product such as flour, semolina or farina. The additional processing steps 16 will often include such conventional steps as roller milling steps, disc milling steps, and sifting steps.

As pointed out above, when a whole grain wheat is disc milled there is a tendency for the bran portion to be cut into small fragments which may be difficult to remove in subsequent sifting and purifying operations. The milling system of FIG. 1 overcomes this problem with the bran removal step 12 that removes a substantial part of the bran prior to the disc milling step 14. In this way the efficiency of the overall milling system is increased, and the many advantages of disc mills are obtained without the problems associated with passing a whole grain wheat through a disc mill.

Figure 2:
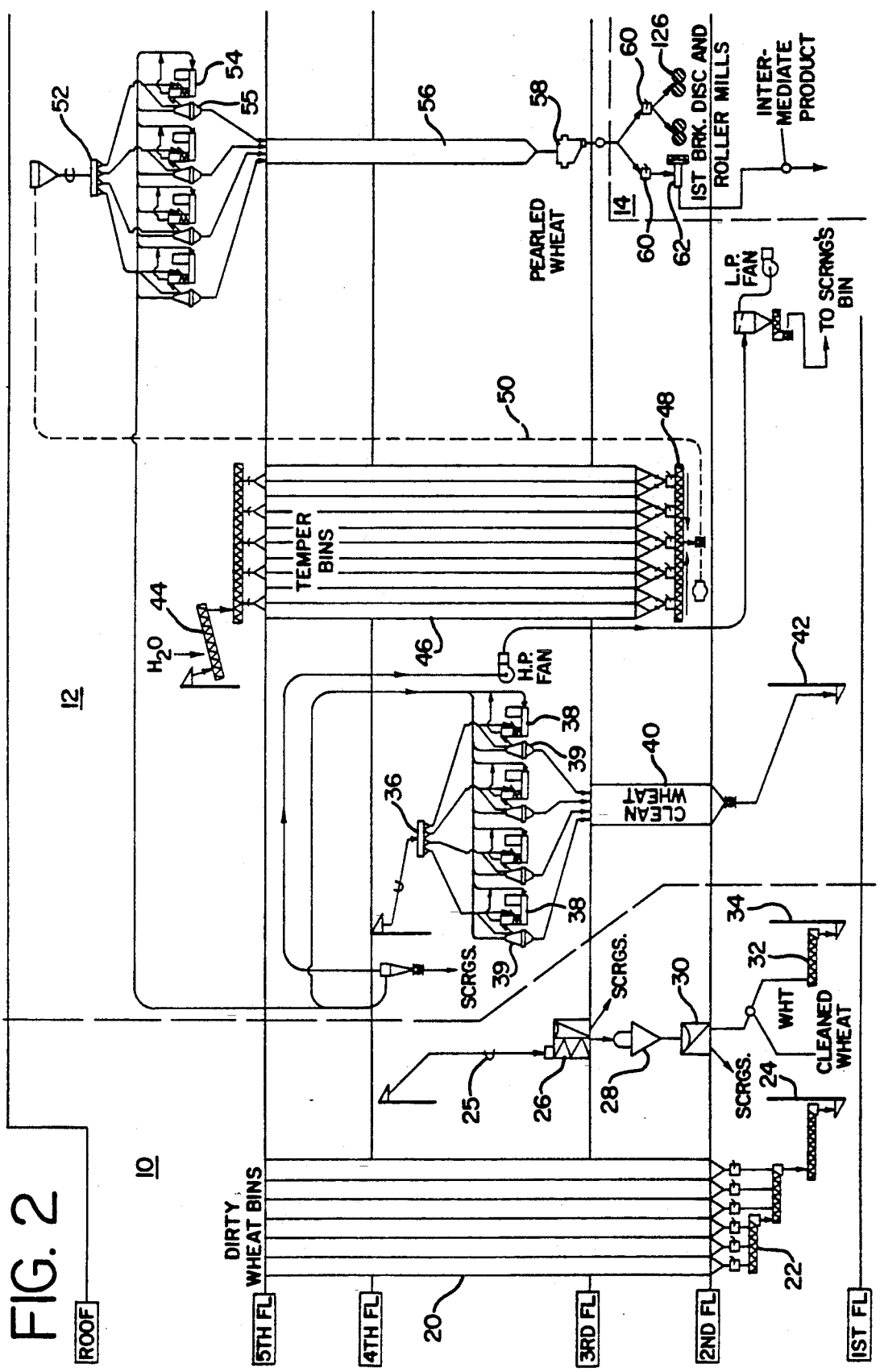
FIG. 2 is a more detailed flow diagram of the cleaning and bran removal steps of FIG. 1.

Turning now to FIG. 2, further details of a preferred embodiment of the cleaning step 10 and the bran removal step 12 are provided. As shown in FIG. 2, incoming wheat (so-called "dirty wheat") retained in bins 20 is passed via conventional con. conveyors 22 and a lift 24 past a magnetic separator 25 to a milling separator 26. The milling separator 26 may be a conventional device such as a REMO type 1016 ROTOLIPSE. The purpose of the milling separator is to remove trash, seeds and sand from the dirty wheat. Wheat which is passed through the milling separator 26 is then passed through an impact machine 28 to shatter infested berries. Suitable devices are available from Entoleter and Sturtevant. The impact machine sold by Sturtevant as a number 6 SIMPACTOR has been found suitable. The output of the impact machine 28 is applied to an aspirator 30 such as a 48 inch duo aspirator which passes the sound wheat via a conveyor 32 and a lift 34 to a distributor 36.

The distributor 36 receives cleaned wheat from the cleaning step 10 and distributes the cleaned wheat to four bran removal machines 38 operating in parallel. The structure and operation of the bran removal machines 38 will be described in greater detail below in conjunction with FIGS. 3 through 6. Here it is enough to state that the bran removal machines 38 are a modified version of the device disclosed in Salete-Garces U.S. Pat. No. 4,583,455 and that they operate to remove a substantial part of the bran portion of the cleaned wheat without substantially reducing the size of the endosperm.

In this embodiment the bran removal machines 38 are preferably operated at a rotational speed of 1300 RPM with an input air flow of 800 ft$^3$/mm. Residence time of the wheat in the bran removal machines 38 is controlled such that bran amounting to about 2.5 wt % of the incoming cleaned wheat is removed.

The partially pearled wheat from the bran removal machines 38 is passed through aspirators 39 to separate removed bran from the wheat. A turbo aspirator similar to that marketed by OCRIM as Model 450 but reduced in capacity by about ⅓ has been found suitable. The wheat is then transported to a bin 40, and via a lift 42 to a mixing conveyor 44. Water is added to the wheat in the mixing conveyor 44, and the wheat is then stored in tempering bins 46. Preferably, the wheat is stored for a period of about 3 hours. In this embodiment the final moisture content of the flour produced by the milling system is intended to be about 13.6 wt %. It has been found advantageous to increase the moisture content of the wheat in the tempering bins 46 as compared to the incoming wheat by about 2 wt % to a moisture content of about 14.7 wt %.

After a suitable tempering time, wheat from the tempering bins 46 is transported via a conveyor 48 and a pressure lift 50 to a distributor 52. The distributor 52 directs the tempered wheat to a second set of four bran removal machines 54 operating in parallel. The bran removal machines 54 are identical to the bran removal machines 38 described above, and are also operated to remove bran from the tempered wheat amounting to about 2.5 wt % of the tempered wheat. The wheat emerging from the bran removal machines 54 is pearled wheat which is cleaned in aspirators 55 and held temporarily in a bin 56 prior to being dispensed for milling via a scale 58 and volumetric feeders 60.

In this embodiment a portion of the pearled wheat is applied in the disc milling step 14 as a feed stock to a disc mill 62. The disc mill 62 thus processes wheat having an endosperm of substantially unreduced size, but from which a large fraction of the bran has been removed. Thus, the disc mill 62 operates in the first break position. In this particular example, roller mills 126 are also operated in the first break position, though of course it would be possible to use multiple disc mills or larger capacity disc mills such that all of the first break mills were disc mills.

The output of the disc mill 62 and the roller mills 126 is applied to further processing steps, as shown by way of example in FIG. 8. FIG. 8 defines the additional disc mills 132, roller mills 130, and sifters 128 included in the further processing steps 16. The notation of FIG. 8 is defined in co-pending U.S. Pat. application Ser. No. 07/557,631 assigned to the assignee of the invention, and the relevant portions of this application are hereby incorporated by reference. Here, it is enough to emphasize that the additional processing steps of FIG. 8 progressively reduce the size of the endosperm and sift the output of the various mills to separate flour from a number of by-products. In this example, the finely divided milled product of FIG. 1 is flour.

Turning now to FIGS. 3 through 6, the structure of one of the bran removal machines 38 will be explained in detail. Of course, as pointed out above the bran removal machines 54 are identical.

Figure 3:
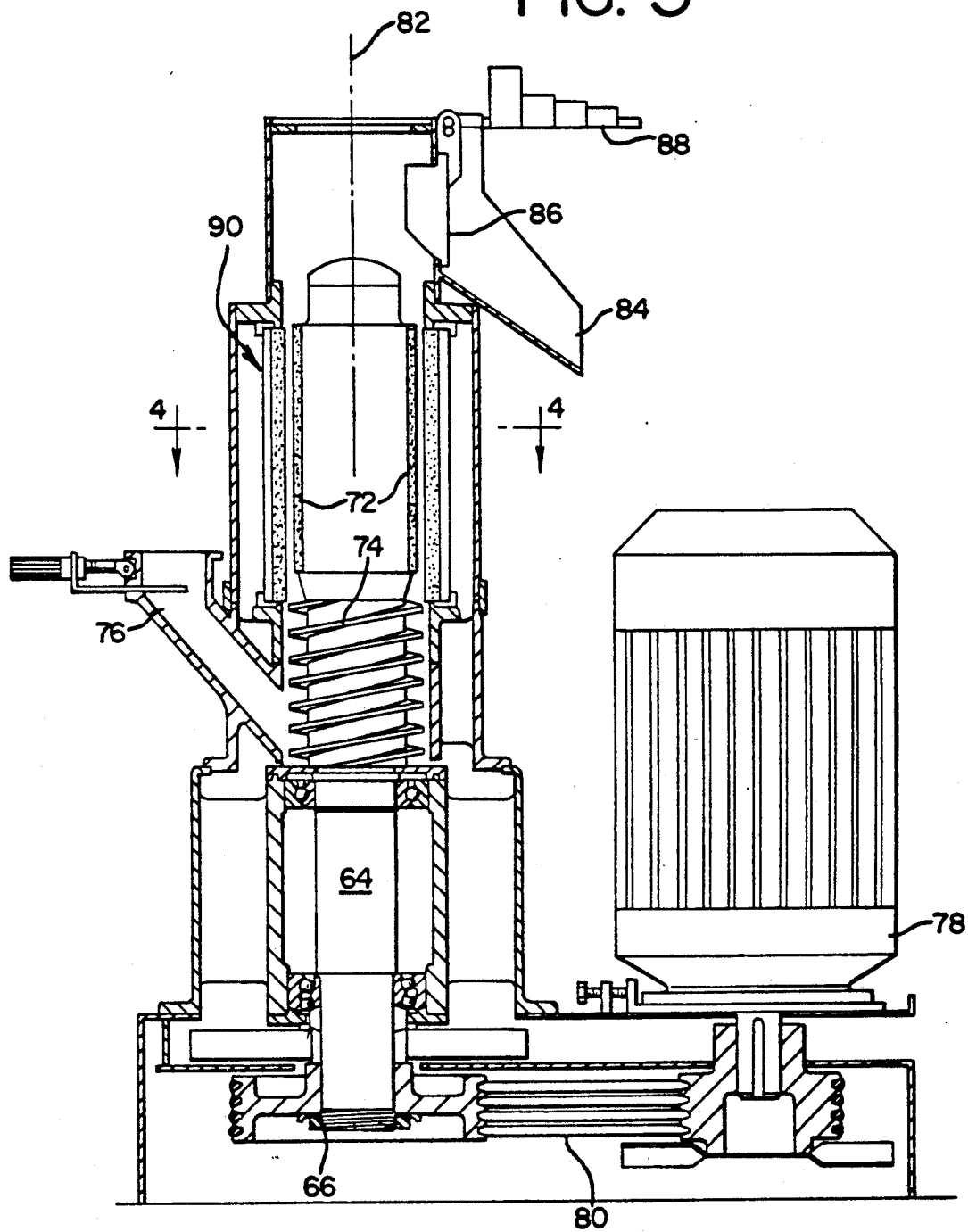
FIG. 3 is a side elevational view in partial cutaway of one of the bran removal machines of FIG. 2.
Figure 8F:
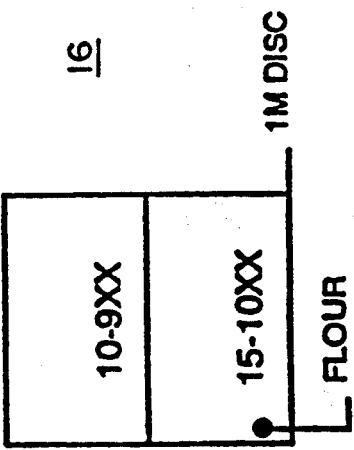
FIGS. 8a–8t are flow diagrams of the disc milling and additional processing steps of FIG. 1.
Figure 8H:
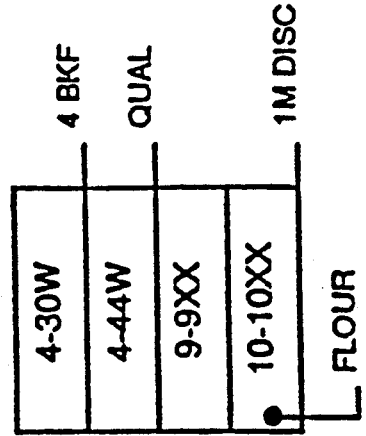
Figure 8E:
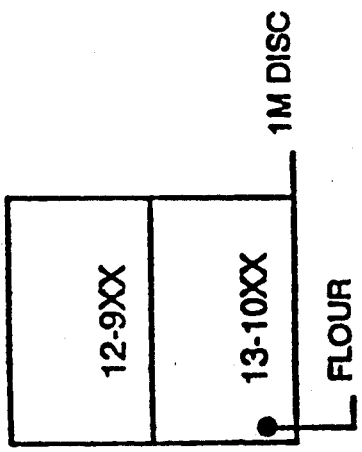
Figure 8G:
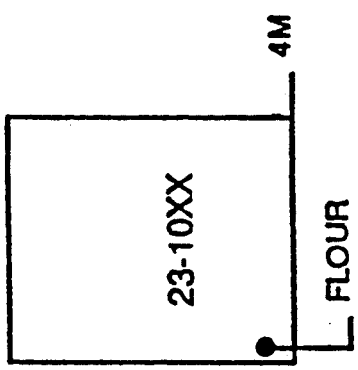
Figure 8N:
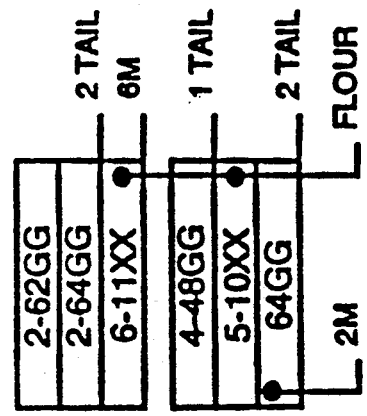
Figure 8P:
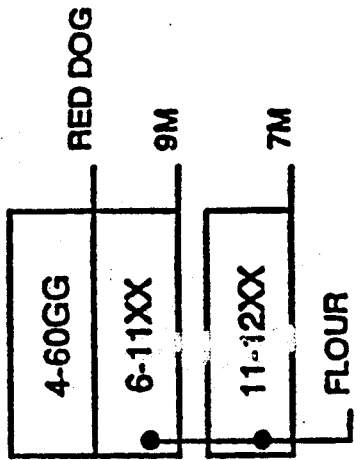
Figure 8O:
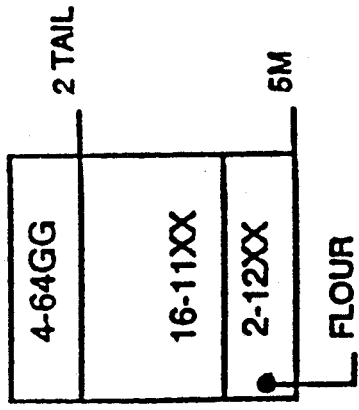
Figure 8M:
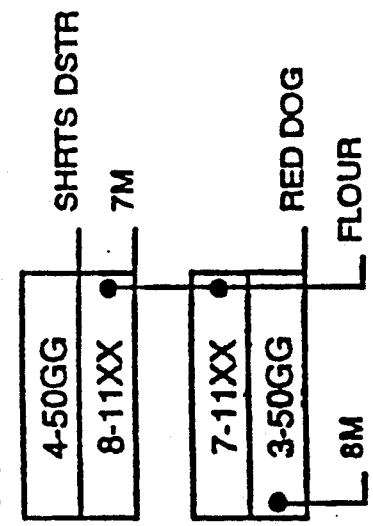
Figure 8R:
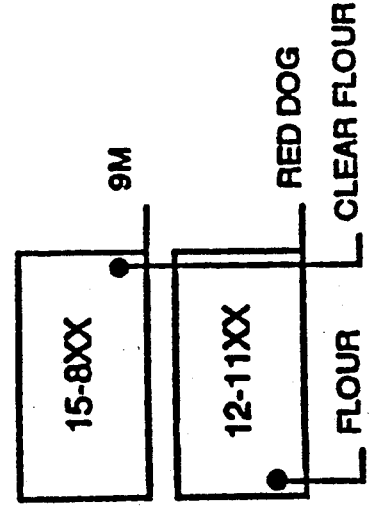
Figure 8T:
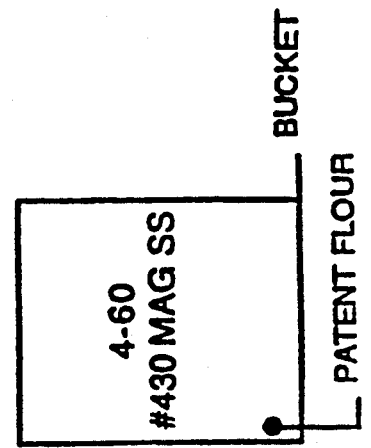
Figure 8Q:
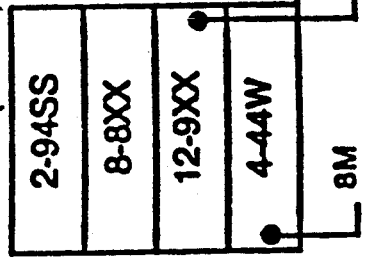
Figure 8S:
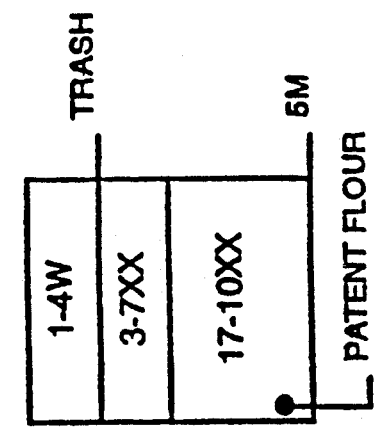

As shown in FIG. 3, the bran removal machine 38 includes a rotor 64 which is vertically oriented and defines a central passage 68 that terminates at a lower end 66. Horizontal openings 70 are formed in the rotor 64 along the upper portion of its length. In use, compressed air is introduced into the passage 68 at the lower end 66 and passes via the openings 70 radially outwardly. The rotor has mounted on it two inner abrasive elements 72, and the rotor defines screw flights 74 immediately beneath the inner abrasive elements 72. An inlet 76 introduces a cereal grain such as wheat into the region immediately adjacent to the screw flights 74, and a motor 78 rotates the rotor 64 by means of belts 80. In this way the rotor 64 is rotated about a vertical axis 82, and the screw flights 74 lift the incoming grain upwardly past the inner abrasive elements 72 and out an outlet 84. A pivotably mounted gate 86 provides an adjustable force tending to retain grain in the region of the inner abrasive elements 72, and this gate 86 is biased to a closed position by adjustable weights 88. Further details may be found in U.S. Pat. application Ser. No. 07/557,631 and in Salete-Garces U.S. Pat. No. 4,583,455. The above described features of the bran removal machine 38 are conventional, and a suitable device incorporating these features may be obtained from Remo S. A., Mexico City, identified as VERTI-JET III.

As best shown in FIGS. 3 and 4, the upper portion of the rotor 64 is surrounded by an enclosure assembly 90 which defines a grain receiving annular passage around the rotor 64. This enclosure assembly 90 is structurally built around a tube 92 which in this preferred embodiment is formed of an aluminum alloy and has an inner diameter of 9 inches and an outer diameter of 10 inches. The tube 92 defines four generally rectangular openings 94, as shown in FIGS. 4 and 6. As best shown in FIG. 4, outer abrasive elements 96 are secured to the inner wall of the tube 92. Each of the outer abrasive elements 96 defines a pair of studs 98 and an inwardly facing abrasive surface 100. A wide variety of materials can be used to define the abrasive surfaces 100, including stones, ceramics, and metallic inserts. In the presently preferred embodiment the abrasive surfaces 100 are defined by files which are spot welded to a carrier bar, as shown in FIGS. 5a and 5b. A suitable file is that supplied by McMaster-Carr (Chicago, IL) as part number 4277A14 having double cut file teeth on one end and rasp teeth on the other. An alternate structure is defined in above referenced U.S. Pat. application Ser. No. 07/557,631.

In this preferred embodiment, the individual outer abrasive elements 96 are provided with dimensions A through D as shown in FIG. 5 and defined in Table 1.

TABLE 1

| Reference Symbol | Dimension (Inches) |
|---|---|
| A | 10.5 |
| B | 1.25 |
| C | 0.375 |
| D | 1.25 |

Two screens 102 are mounted as shown in FIG. 4 in alignment with the openings 94. These screens are clamped in position by adjacent outer abrasive elements 96 and a central retainer 104. The screens 102 may be conventional screens as described in above-referenced U.S. Pat. application Ser. No. 07/557,631 having openings measuring approximately 1 mm × 10 mm.

A collection hood (not-shown) is mounted to the outer surface of the tube 92 around the openings 94 to draw off air and entrained bran fragments removed from the grain by the operation of the inner and outer abrasive elements 72, 96.

In operation, the motor 78 rotates the rotor 64 to move grain upwardly through the grain receiving passage defined by the enclosure assembly 90 and to rotate the inner abrasive elements 72. A suitable gas such as air, nitrogen or the like is forced up the central passage 68, out the openings 70, through the grain to fluidize the grain and to transport bran removed from the grain out the screens 102.

It has been found that an increased amount of bran can be removed from the wheat as it passes through the bran removal machine 38 as compared with the prior art device described in U.S. Pat. No. 4,741,973. This is believed to be a result of the relatively large cumulative arc occupied by the outer abrasive elements 96. In this embodiment the outer abrasive elements 96 occupy a cumulative arc of about 300°, significantly greater than the prior art device of U.S. Pat. No. 4,741,913 in which the outer abrasive elements occupy a cumulative arc of about 180°. Similarly, in this embodiment the screens 102 occupy a cumulative arc of about 50° and the retainer 104 occupies a cumulative arc of about 10°. Of course, it is not essential in all embodiments that the screens 102 be grouped at one side of the enclosure assembly 90, and the term "cumulative arc" is intended to refer to the sum of the individual arcs of each of the elements included in the set.

The foregoing preferred embodiment has been optimized to mill soft wheat. However, this invention is not limited to the milling of soft wheat, and can be used with other wheats such as durum and hard wheat, as well as with other cereal grains such as oats, barley, corn, rye and sorghum.

Turning now to FIG. 7, this figure provides a schematic representation of the disc mill 110. As shown in FIG. 7, the disc mill 110 includes an inlet 112 and an outlet 114. A fixed disc 116 is fixedly mounted with respect to the inlet 112, and a rotating disc 118 is mounted on a shaft 122 for rotation about a substantially horizontal axis 124. Each of the discs 116, 118 defines a respective annular grinding surface 120, and wheat passes radially outwardly between the grinding surfaces 120 as shown by the arrows. As the wheat passes between the grinding surfaces 120 it is reduced in size. The disc mill supplied by United Milling Systems A/S as Disc Mill No. MHA600 has been found suitable. This mill is described in detail in U.S. Pat. No. 4,667,888.

From the foregoing, it should be apparent that an improved milling system and an improved bran removal machine have been described. The milling system allows a disc mill to be used efficiently in the first break position. Such mills have been found to exhibit a lower capital cost, lower operating cost, lower maintenance cost and additionally to require less operating space as compared to conventional roller mills. Furthermore, these mills can be operated with increased safety, and they are relatively easy to setup and to operate with minimum adjustment. Additionally, the particle size distribution provided by the disc mill has been found to provide advantages in certain applications. The present invention, by using a disc mill in the first break position, has increased the application of disc mills, and therefore the advantages obtained from them.

As pointed out above, the improved bran removal machine described above removes a large fraction of bran in a single pass, and operates with a large throughput. In practice, throughputs as large as 175 bushels per hour per bran removal machine have been obtained in routine operation.

Of course, it should be understood that a wide range of changes and modifications can be made to the preferred embodiment described above. The milling system can be adapted for use with other cereal grains, and the bran removal machine can be used in other milling systems, including those which do not utilize disc mills.

In the disclosed system the wheat is tempered between first and second sets of bran removal machines. In alternate systems it may be preferable to temper the wheat entirely before it is introduced into a bran removal machine (as described in U.S. Pat. application Ser. No. 07/557,631) or after the wheat has passed through the bran removal machines (as described in Sataki U.S. Pat. No. 4,741,913 and Tkac European Patent Applications EP 0 295 774 and EP 0 373 274). Details of the geometry of the enclosure assembly and of the structure of the abrasive elements can be modified as desired for the particular application.

It is therefore intended that the foregoing detailed description be regarded as illustrative rather than limiting, and that it be understood that it is the following claims, including all equivalents, which are intended to define the scope of this invention.

What is claimed is:

1. A process for milling a quantity of a cereal grain of the type comprising an endosperm and a bran portion, said process comprising the following steps:

removing at least a substantial part of the bran from the cereal grain without substantially reducing the size of the endosperm to produce a pearled cereal grain, said removed bran portion amounting to at least about 5 wt % of the cereal grain;

disc milling at least a portion of the pearled cereal grain to reduce the size of the endosperm and to produce an intermediate product, wherein the endosperm of said at least a portion of the pearled cereal grain is substantially unreduced in size prior to the disc millings step; and further processing the intermediate product to produce a finely divided milled product.

2. The process of claim 1 wherein the further processing step comprises the step of disc milling a portion of the intermediate product.

3. The process of claim 1 wherein the further processing step comprises the step of roller milling a portion of the intermediate product.

4. The process of claim 1 wherein the further processing step comprises the step of sifting at least a portion of the intermediate product.

5. The process of claim 1 wherein the disc milling step comprises the following steps:

providing a disc mill of the type comprising a pair of milling discs and means for rotating one of the milling discs about a substantially horizontal axis; and passing the pearled cereal grain between the milling discs while rotating said one of the milling discs.

6. The process of claim 1 wherein the bran removing step comprises the following steps:

providing a bran removal machine of the type comprising inner and outer abrasive elements and means for rotating one of the inner and outer abrasive elements with respect to the other about a substantially vertical axis; and passing the cereal grain vertically between the inner and outer abrasive elements while rotating the inner and outer abrasive elements relative to one another and causing a gas to flow through the cereal grain.

* * * * *